Jan. 3, 1939.   E. C. HANSON   2,142,785
HEATING DEVICE FOR AIRCRAFT
Filed March 15, 1935

Inventor:
Earl C. Hanson
By Parkinson & Lane
Attorneys.

Patented Jan. 3, 1939

2,142,785

UNITED STATES PATENT OFFICE 2,142,785

HEATING DEVICE FOR AIRCRAFT

Earl C. Hanson, Chicago, Ill.

Application March 15, 1935, Serial No. 11,314

3 Claims. (Cl. 219—47)

The present invention relates to a heating device and more particularly to a novel means and mechanism of utilizing in an aircraft or the like, the heating effects produced by eddy currents created by a source of electrical energy of high frequency.

Among the objects of the present invention is to provide a novel heating device, for preventing the formation of, or the removal of ice or sleet from the leading edge of a structure such as the wings and control sections of an aircraft, including the elevators, stabilizers, rudder; in fact, anywhere where the formation of ice or sleet would be detrimental to the control and weight of such aircraft.

A further object of the invention is to provide a novel means and mechanism for utilizing in an aircraft, the heat produced by eddy currents created by a source of electrical energy of high frequency. The flow of such currents may be readily controlled so that the heat produced thereby may be utilized whenever necessary to prevent the formation of ice or sleet, or the removal thereof when once formed.

A still further object of this novel invention is the provision of such a novel means and mechanism occupying a minimum of space and adding but little to the weight of the aircraft and which may be readily installed wherever necessary or desirable to prevent the formation of ice or sleet, or to cause the removal thereof when already formed.

Yet another object of the invention is the provision of a novel method of preventing the formation of ice or sleet, or the removal of the same when once formed, from the leading edge of an airplane wing and/or control sections, or wherever the formation of ice or sleet would be detrimental to the operation and control of the aircraft.

Further objects are to provide a construction of maximum simplicity, efficiency, economy and ease of assembly and operation, and such further objects, advantages and capabilities as will later more fully appear, and as are inherently possessed thereby.

The invention further resides in the combination, construction and arrangement of parts illustrated in the accompanying drawing, and while there is shown therein a preferred embodiment, it is to be understood that the same is susceptible of modification and change and comprehends other arrangements, details, and constructions, without departing from the spirit of the invention.

Figure 1:
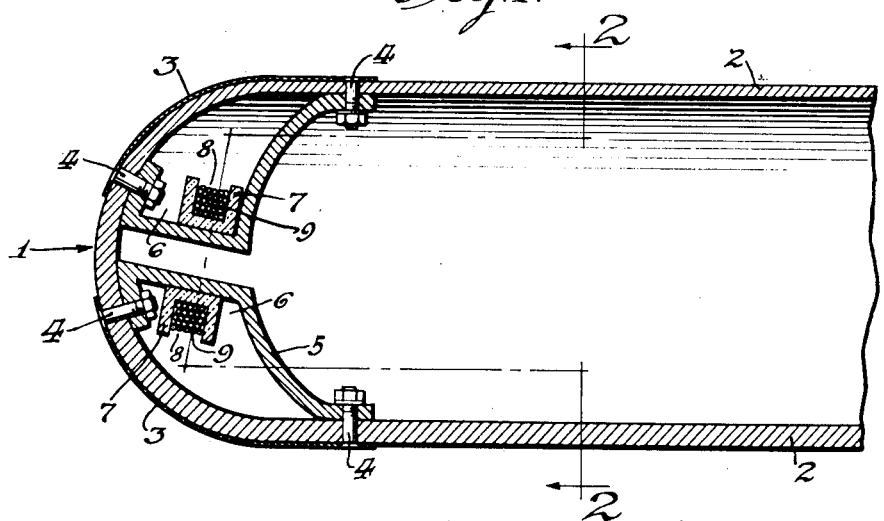
Fig. 1 is a fragmentary view in vertical and transverse cross-section through an airplane wing showing one embodiment of the invention.
Figure 2:
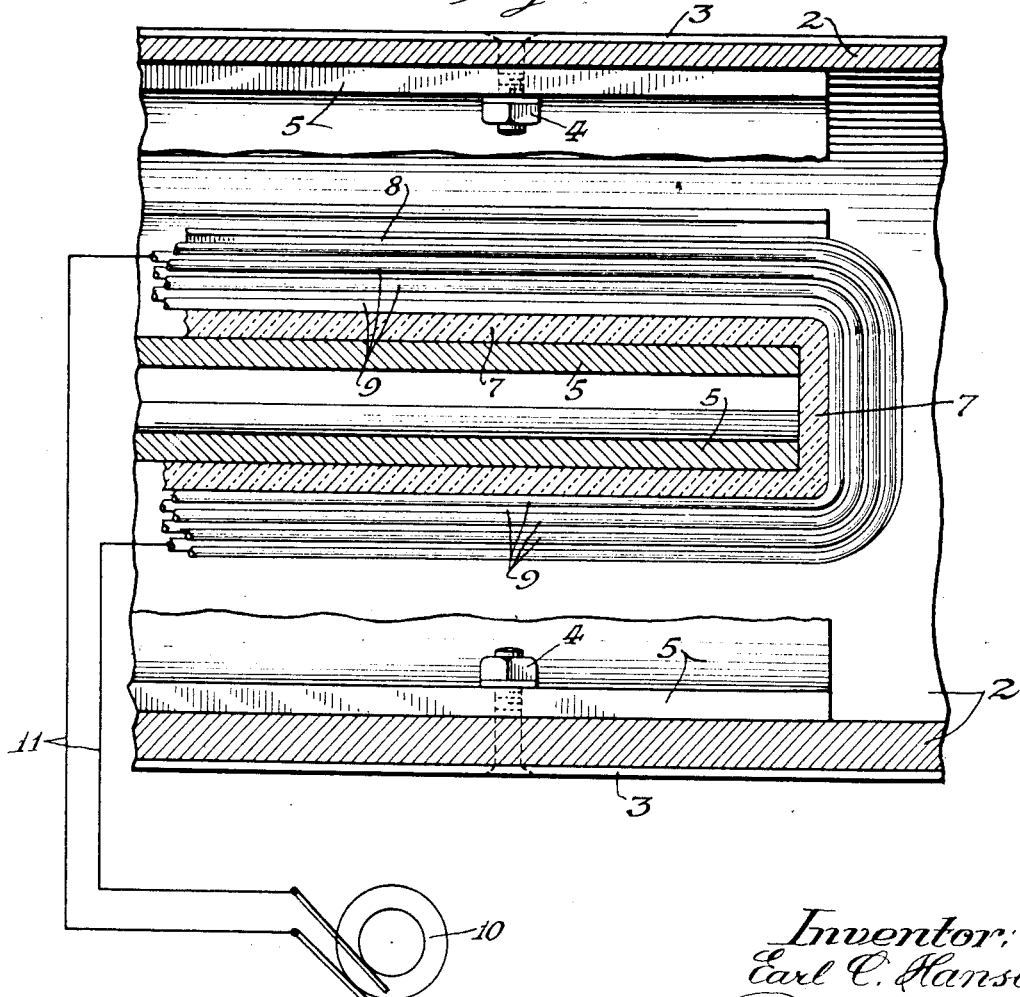
Fig. 2 is a view in vertical cross section taken on the irregular line 2—2 of Fig. 1, but on an enlarged scale.

Referring more particularly to the disclosure in the drawing, in the embodiment selected to illustrate the invention, the numeral 1 refers to the leading edge of an airplane wing 2. Mounted upon the exterior surface of the leading edge of this wing are provided spaced strips or sheets of magnetic material or metal 3 forming heating elements and secured to the wing section by means of bolts or other fastening means 4. These heating elements are of relatively thin cross-section and take the contour of the leading edge of the wing.

Mounted within the wing is provided an elongated member 5 formed to provide spaced longitudinally extending and oppositely faced channels or grooves 6 in which is mounted an insulated bobbin 7. This bobbin in turn is also formed with a channel to provide a groove or opening 8 in which is mounted an inductor or inductance coil 9. This member 5 is of magnetic material and of greater thickness than the elements 3 and is secured in place by the bolts or other attaching means 4, which also secure the heating elements 3 against the outer contour of the wing. Thus this member forms a return path for the magnetic circuit, including the external heating elements or strips which prevent the formation of the ice or sleet, or the removal thereof when once formed. Thus the leading edge or any control section may always be maintained cleared of such formation.

Any suitable source of high frequency current may be employed for energizing the inductance coil 9 in the preferred form. Such source may be a radio frequency alternator 10, although the invention comprehends the provision or use of a vacuum tube oscillator or any means for creating a high frequency magnetic field.

It will be readily appreciated that but one source of electrical energy is necessary, but any number of such heating units may be employed and positioned within any section of the airplane wings, stabilizers, elevators, rudder, etc.

In operation, the high frequency currents flowing from the alternator 10 pass through the transmission lines or wires 11 to the inductance coil 9. The inductor creates a high or radio frequency electro-magnetic field around the magnetic circuit, including the heating elements or sheets 3 on the external surface of the wing and the magnetic return path member 5 mounted within the wing. This magnetic field induces eddy currents in the heating plates or elements 3 which produce heat in amounts sufficient to prevent the formation of, or the removal of ice or sleet from the area covered by and contiguous with the heating elements.

Whenever the leading edge or wing structure is formed of metal capable of being magnetized, such edge may form the heating elements and thereby dispense with the separate strips or sheets which are affixed to the leading edge and form the heating elements of the disclosed embodiment.

Suitable switching mechanism is preferably provided for alternately or successively energizing separate units or sections located in the various parts of the aircraft. Thus a smaller alternator may be employed and its full power applied for a short period of time to successive units or sections. Such switching mechanism may be automatically or manually operated, as desired.

In the commercial form of the invention, it may be preferable that the alternator or other source of high frequency currents be of sufficient power output to operate the lighting, radio apparatus, and/or other appliances which may be energized or operated thereby. For example, heating pads may be provided for the comfort of the pilots or passengers. Also the inductor unit may be employed in conjunction with the carburetion system to prevent the formation of ice.

Having thus disclosed the invention,

I claim:

1. Mechanism for heating parts of an aircraft, comprising a source of electrical energy of high frequency, an inductance coil connected to said source and located within said part, a magnetic member associated with the coil, and heating elements provided on the exterior of the wing and associated with said coil and member forming a closed magnetic circuit whereby said coil creates a high frequency magnetic field in said circuit and induces eddy currents in said heating elements.

2. Mechanism for preventing the formation of, or the removal of ice or sleet when once formed on the leading edge of airplane wings, stabilizers, elevators or other control sections, comprising a source of electrical energy of high frequency, a magnetic member mounted within the leading edge, an inductor positioned within said member, and heating elements provided on the leading edge and associated with the inductor whereby the inductor creates a high frequency magnetic field and induces eddy currents in the heating elements.

3. Mechanism for preventing the formation of, or the removal of ice or sleet when once formed on the leading edge of airplane wings, stabilizers, elevators or other control sections, comprising a source of electrical energy of high frequency, heating elements provided on the leading edge, an inductor positioned within the leading edge, and a mounting for the inductor, said heating elements, inductor and mounting being so constructed and arranged as to form a closed magnetic circuit whereby the inductor creates a high frequency magnetic field in the circuit and induces eddy currents in the heating elements.

EARL C. HANSON.